(12) United States Patent
Silva Sousa et al.

(10) Patent No.: US 11,704,906 B2
(45) Date of Patent: *Jul. 18, 2023

(54) VISUAL TAG EMERGING PATTERN DETECTION

(71) Applicant: Snap Inc., Santa Monica, CA (US)

(72) Inventors: Vítor Silva Sousa, Los Angeles, CA (US); Lin Qiu, State College, PA (US); Nils Murrugarra-Llerena, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,827

(22) Filed: May 31, 2022

(65) Prior Publication Data

US 2022/0292823 A1 Sep. 15, 2022

Related U.S. Application Data

(63) Continuation of application No. 17/120,933, filed on Dec. 14, 2020, now Pat. No. 11,393,203.

(51) Int. Cl.
*G06K 7/10* (2006.01)
*G06V 20/40* (2022.01)
*G06N 20/00* (2019.01)

(52) U.S. Cl.
CPC .......... *G06V 20/40* (2022.01); *G06K 7/10138* (2013.01); *G06N 20/00* (2019.01)

(58) Field of Classification Search
CPC ..... G06V 20/40; G06N 20/00; G06K 7/10138
USPC ........................................................ 235/454
See application file for complete search history.

(56) References Cited

U.S. PATENT DOCUMENTS

| | | | |
|---|---|---|---|
| 8,942,542 B1 | 1/2015 | Sherrets et al. | |
| 11,132,623 B2 | 9/2021 | Wang et al. | |
| 11,393,203 B2* | 7/2022 | Silva Sousa | H04N 21/4667 |
| 2010/0293048 A1 | 11/2010 | Singolda et al. | |
| 2016/0350658 A1 | 12/2016 | Kedia et al. | |
| 2017/0329762 A1 | 11/2017 | Lintz | |
| 2018/0249193 A1 | 8/2018 | Zhang et al. | |
| 2019/0066158 A1 | 2/2019 | Choi et al. | |
| 2020/0126100 A1 | 4/2020 | Goyal et al. | |

FOREIGN PATENT DOCUMENTS

EP 2747014 A1 6/2014

OTHER PUBLICATIONS

International Search Report and Written Opinion for International Application No. PCT/US2021/058703, dated Feb. 22, 2022 (Feb. 22, 2022)—15 pages.

* cited by examiner

*Primary Examiner* — Daniel A Hess
(74) *Attorney, Agent, or Firm* — Culhane Meadows PLLC; Stephen J. Weed

(57) ABSTRACT

Systems, devices, media, and methods are presented for identifying emerging viewing patterns for visual media such as still images and videos. Emerging viewing patterns are identified by identifying visual tags for visual media viewed by users, selecting a subset of the tags by applying a taxonomy-based filter, generating pattern candidates from the subset, evaluating consumption metrics for each of the generated patterns, and ranking the generated pattern candidates responsive to the consumption metrics to identify emerging viewing patterns for the users.

20 Claims, 8 Drawing Sheets

VISUAL TAG EMERGING PATTERN DETECTION

CROSS-REFERENCE TO RELATED APPLICATIONS

This application is a Continuation of U.S. application Ser. No. 17/120,933 filed on Dec. 14, 2020, the contents of which are incorporated fully herein by reference.

TECHNICAL FIELD

Examples set forth in this disclosure relate generally to applications running on client devices and server systems supporting those devices. More particularly, but not by way of limitation, this disclosure addresses systems and methods for identifying emerging visual media viewing patterns, e.g., to tailor content and advertising to viewers.

BACKGROUND

Visual media such as still images and video are routinely viewed by users on electronic devices. The visual media is typically stored by a server system and sent to the electronic devices of the users for viewing.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION

Figure 1:
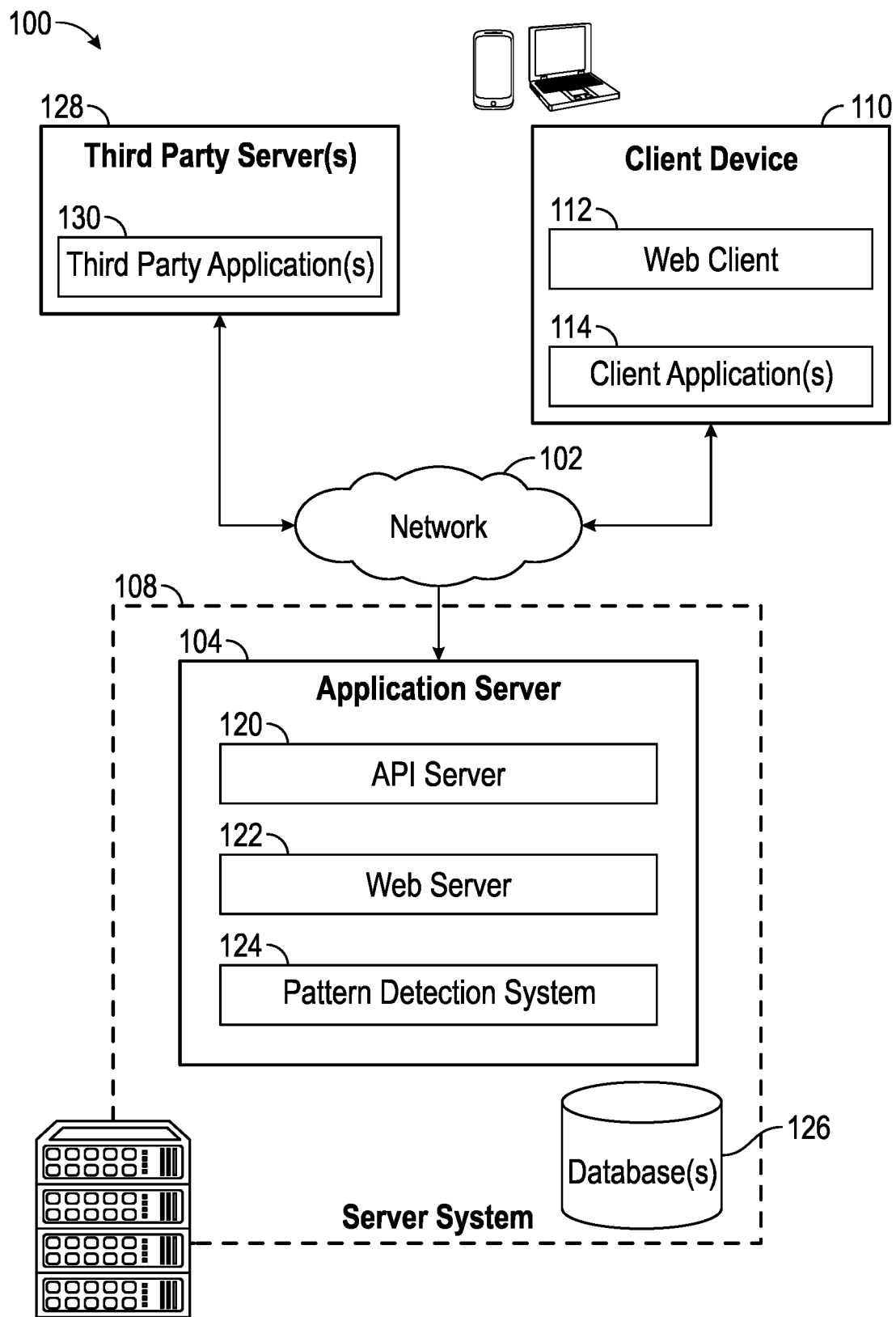
FIG. 1 is a block diagram of an example emerging pattern detection system in an online client-server system.

Aspects of the subject matter disclosed herein are directed to identifying emerging viewing patterns for visual media (e.g., still images or video) using visual tags. In social media platforms, users produce several sorts of content that become available for consumption by other users. The consumption may change over time according to the users' cohorts (i.e., age group, gender), location, or external events (i.e., political, economic, cultural). Understanding topics that viewers are engaging is useful for (i) recommending new content, (ii) retaining users, and (iii) finding new partnerships. Instead of looking at all visual tags available through computer vision detection individually, filtering techniques are applied in order to select more specific visual tags (e.g., only leaf nodes in a taxonomy) and combinations of those selected tags are evaluated to better identify emerging viewing patterns and trends.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for identifying emerging viewing patterns for visual media (e.g., still images or video) viewed by groups of users. The method identifies emerging viewing patterns by identifying visual tags for each of a plurality of visual media viewed by a first of the groups of users, selecting a subset of the identified visual tags by applying a taxonomy-based filter, generating pattern candidates from the selected subset, each of the pattern candidates including two or more of the identified visual tags from the subset of the identified visual tags, evaluating consumption metrics of the visual media by the first group of users for each of the generated pattern candidates, and ranking the generated pattern candidates responsive to the evaluated consumption metrics to identify emerging viewing patterns for the first group of users.

In accordance with another example, a system is provided for identifying emerging viewing patterns. The system includes a processor. The processor is configured to identify visual tags for each of a plurality of visual media viewed by a first of the groups of users, select a subset of the identified visual tags by applying a taxonomy-based filter, generate pattern candidates from the selected subset, each of the pattern candidates including two or more of the identified visual tags from the subset of the identified visual tags, evaluate consumption metrics of the visual media by the first group of users for each of the generated pattern candidates, and rank the generated pattern candidates responsive to the evaluated consumption metrics to identify emerging viewing patterns for the first group of users.

In accordance with another example, a non-transitory processor-readable storage medium is provided that stores processor-executable instructions that, when executed by a processor of a machine, cause the machine to perform operations to identify emerging viewing patterns of visual media. The operations performed by the machine include identifying visual tags for each of a plurality of visual media viewed by a first of the groups of users, selecting a subset of the identified visual tags by applying a taxonomy-based filter, generating pattern candidates from the selected subset, each of the pattern candidates including two or more of the identified visual tags from the subset of the identified visual tags, evaluating consumption metrics of the visual media by the first group of users for each of the generated pattern candidates, and ranking the generated pattern candidates responsive to the evaluated consumption metrics to identify emerging viewing patterns for the first group of users.

FIG. 1 is a block diagram illustrating a system 100, according to some examples, configured to identify emerging viewing patterns of users. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, exchange information over a network 102, and so forth.

In one example, client device 110 is a device of a user who is using a social media application on the device. Client device 110 may call a server for a social platform (e.g., hosted by server system 108) via the social media application directly or through one or more third-party servers 128 (e.g., utilizing one or more third-party applications 130). Application server 104 tracks visual media provided to the client device 110 and corresponding viewing statistics gathered from the client device 110 (e.g., duration of video, time spent watching video, number of time image is viewed, etc.) as a dataset in database 126. By analyzing the dataset using techniques disclosed herein, the application server 104 is able to automatically detect viewing patterns/preferences and to deliver visual media to the client device in accordance with the viewing patterns/preferences.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 128, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via a web client 112 (e.g., a browser) and/or one or more client applications 114. The client device 110 may include one or more client application(s) 114 (also referred to as "apps") such as, but not limited to, a web browser, messaging application, electronic mail (email) application, an e-commerce site application, a mapping or location application, and the like. The client application(s) may also display visual media on a display of the client device 110, gather viewing data for visual media viewed by the user of the electronic device, and generate viewing consumption metrics.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110. The server system 108 includes an application program interface (API) server 120, a web server 122, and a pattern detection system 124, that may be communicatively coupled with one or more database(s) 126. The one or more database(s) 126 may be storage devices that store data (e.g., in a dataset) related to users of the server system 108, applications associated with the server system 108, viewing consumption metrics (e.g., based on demographic information), cloud services, housing market data, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example the server system 108 includes a pattern detection system 124 for detecting emerging patterns in visual media viewing. Pattern detection system 124 may include one or more servers and may be associated with a cloud-based application. Pattern detection system 124 may distribute visual metric applications to gather and store viewing metrics to client devices (e.g., as part of a social medium application or update thereto), obtain viewing metrics from the distributed apps on those client devices, and store those results in a database(s) 126. The pattern detection system 124 analyzes a dataset including the viewing metrics from the client devices to identifying emerging viewing patterns.

The system 100 further includes one or more third party server(s) 128. The one or more third-party server(s) 128 may include one or more third-party application(s) 130. The one or more third-party application(s) 130, executing on third party server(s) 128 may interact with the server system 108 via API server 120 via a programmatic interface provided by the API server 120. For example, one or more of the third-party applications 130 may request and utilize information from the server system 108 via the API server 120 to support one or more features or functions on a website hosted by the third party or an application hosted by the third party.

Figure 2A:
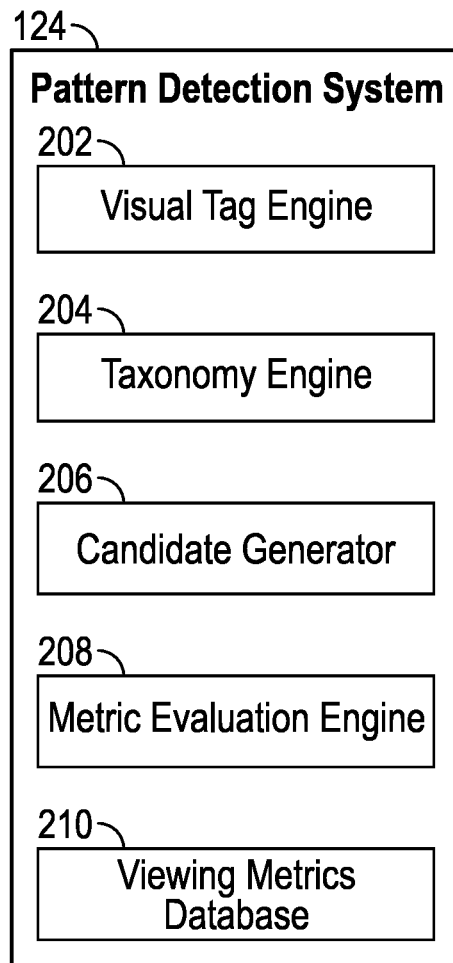
FIG. 2A is a block diagram illustrating an example emerging pattern detection system.

FIG. 2A is a block diagram illustrating an example of the pattern detection system 124. The pattern detection system 124 includes a visual tag engine 202, a taxonomy engine 204, a candidate generator 206, a metric evaluation engine 208, and a viewing metric database 210. The viewing metric database 210 is stored in the database 126 of the server system 108. The device capabilities collection engine 202 and the device inference engine runs on the application server 104 of the server system 108. The visual tag engine 202, taxonomy engine 204, candidate generator 206, and metric evaluation engine 208 run on the server system 108.

The visual tag engine 202 in device capabilities collection engine 202 is configured to analyze visual media and generate tags corresponding to identified objects (e.g., sun, water, boy, girl, etc.) in the visual media. In one example, the process of generating tags is implemented using a machine-learning algorithm that compares the visual media to a database trained using a collection of tagged images.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

The taxonomy engine 204 selects a subset of the identified visual tags by applying a taxonomy-based filter. The candidate generator 206 generates pattern candidates from the selected subset. In one example, each of the pattern candidates includes two or more of the identified visual tags from the subset of the identified visual tags. The metric evaluation engine 208 evaluates consumption metrics of the visual media by the first group of users for each of the generated pattern candidates and ranks the generated pattern candidates based on the evaluated consumption metrics to identify emerging viewing patterns.

Figure 2B:
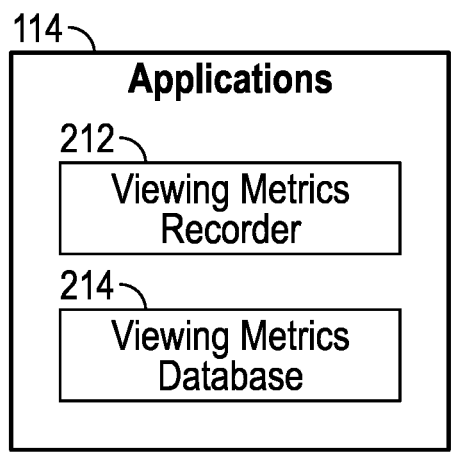
FIG. 2B is a block diagram illustrating example components for implementing emerging pattern detection for a client device.

FIG. 2B is a block diagram illustrating an example of the client applications 114 for use in identifying emerging viewing patterns. These client applications 114 include a viewing metrics recorder 212 and a viewing metric database 214. The viewing metrics recorder 212 monitors viewing of visual media on an electronic device and stores one or more parameters associated with each of the visual media (e.g., how long or how many times it was viewed). The viewing metrics database 214 stores the recorded viewing metrics (e.g., for transmission to the server system 108 for analysis).

Figure 3:
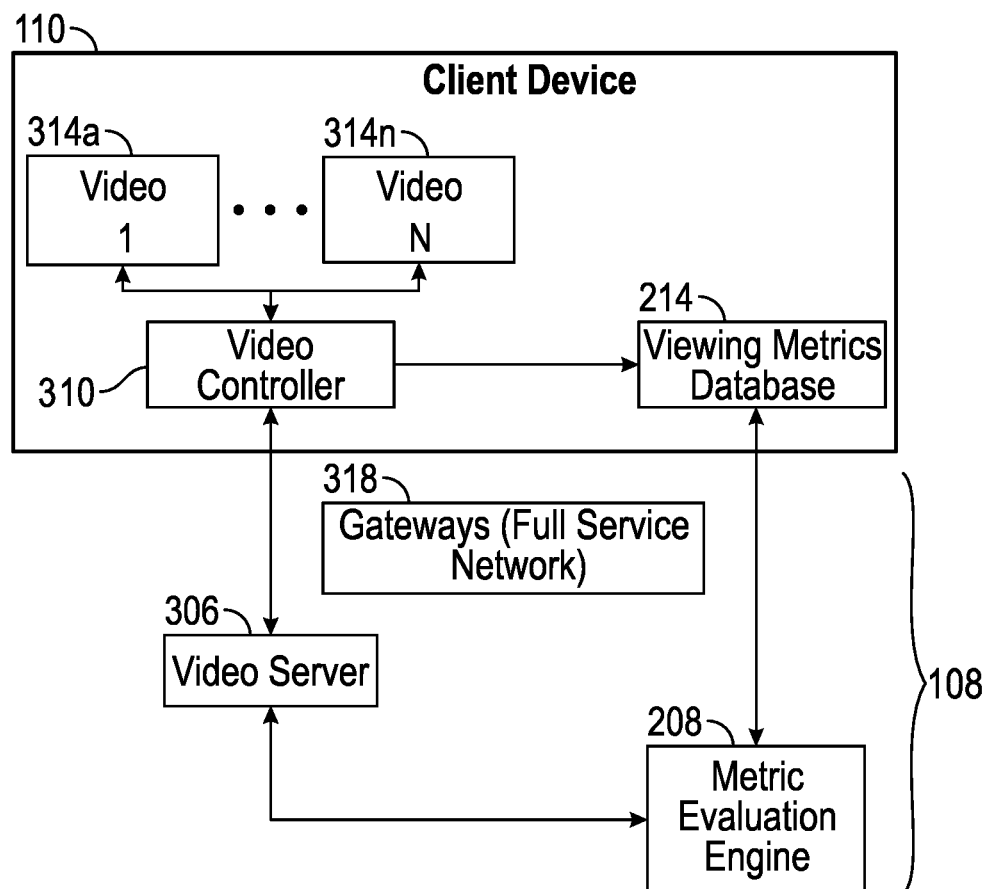
FIG. 3 is a block diagram illustrating server and client components for implementing emerging pattern detection.

FIG. 3 depicts an example of components of the server system 108 and the client device 110 for implementing emerging pattern detection. A video server 306 communicates with the metric evaluation engine 208 and a gateway 318 (e.g., a gateway for a full service network such as the Internet) when scheduling visual media to serve to client device 110. The video server 306 notifies the metric evaluation engine 208 of the visual media that is being scheduled. Additionally, the video server 306 may determine visual media to next serve based on input from the metric evaluation engine 208 once sufficient data is available to detect the emerging viewing patterns of the user of the electronic device 110.

Visual media (e.g., videos 314) received by the electronic device 110 are routed to a video controller 310 for display on a display of the electronic device 110. The video controller 310 receives instructions from user of the electronic device 110 (via a user interface such as a touchscreen) to control playback of the visual media. The video controller 310 tracks data associated with the playback (e.g., time of viewing, total viewing time, number of times viewed etc.) and stores the data in the viewing metrics database 214.

Figure 4:
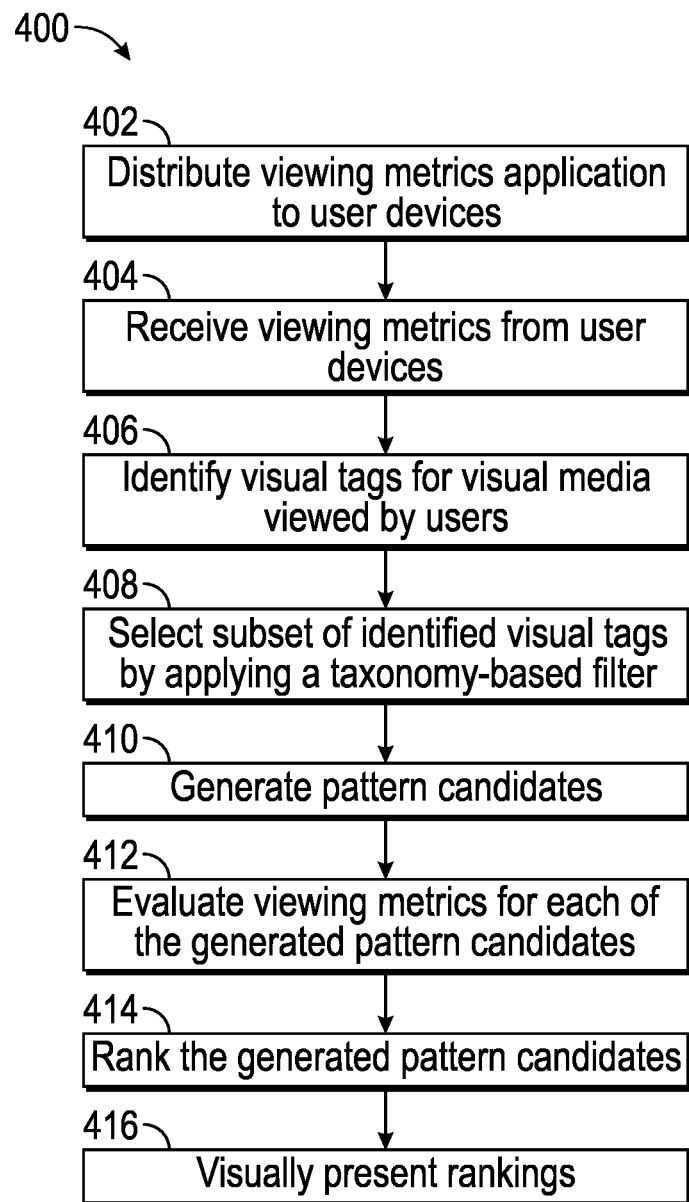
FIG. 4 is a flow diagram illustrating an example method for implementing emerging pattern detection on a server system.
Figure 5:
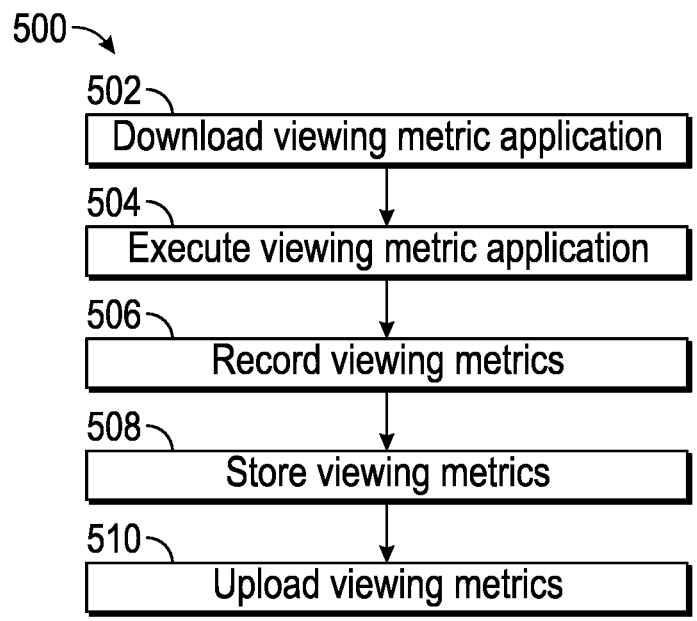
FIG. 5 is a flow diagram illustrating an example method for gathering data on a client device for implementing emerging pattern detection on the server system.
Figure 6:
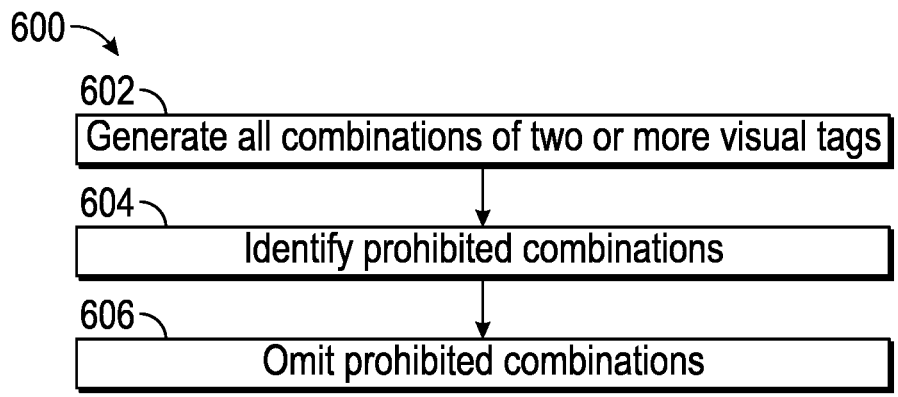
FIG. 6 is a flow diagram illustrating an example method for generating pattern candidates for use in the example method of FIG. 4.
Figure 7:
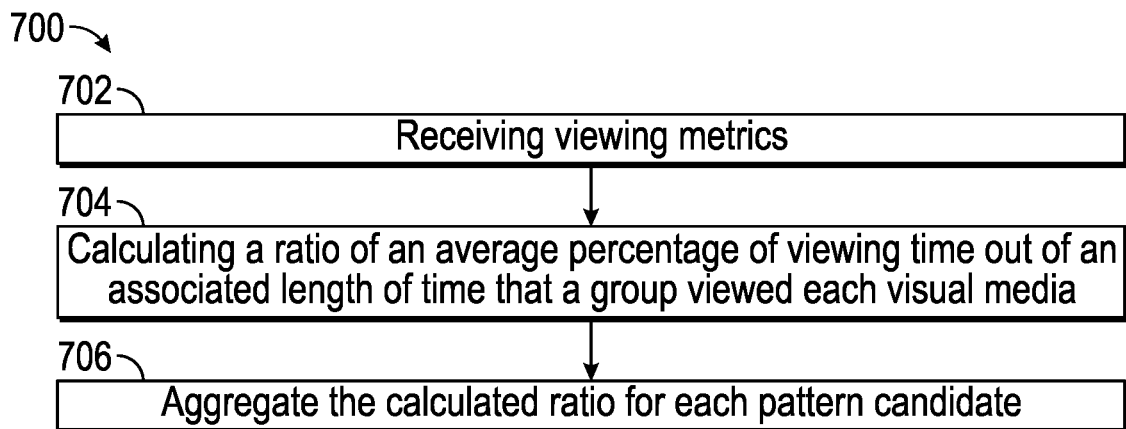
FIG. 7 is a flow diagram illustrating an example method for evaluating pattern candidates for use in the example method of FIG. 4.

FIG. 4 is a flow diagram illustrating an example method 400 for execution by a server system (e.g., server system 108) to detect emerging viewing patterns, FIG. 5 is a flow diagram illustrating an example method 500 for execution by an electronic device (e.g., client device 110) to gather viewing metrics, FIG. 6 is a flow diagram illustrating an example method 600 for generating pattern candidates for use in the example method of FIG. 4, and FIG. 7 is a flow diagram illustrating an example method 700 for evaluating pattern candidates for use in the example method of FIG. 4.

Although the below description of the methods refers to the pattern detection system 124 running on server system 108 and applications 114 on client devices 110, other systems and devices for identifying emerging patterns will be understood from the description herein. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of a methods may be performed in whole or in part, may be performed in conjunction with some or all of the steps in other methods, and/or may be performed by any number of different systems, such as the systems described in FIGS. 1, 2A, 2B, 3, and 8-10.

At block 402, the server system 108 distributes a viewing metrics application 114 to user devices. The viewing metrics application is configured for execution on the electronic devices 110, gathering viewing metrics for visual media presented on the electronic device, and returning viewing metrics to the server system 108 for pattern analysis to identify emerging viewing patterns. The visual media may include still images, videos, or a combination thereof.

At block 404, the server system 108 receives the viewing metrics from the electronic devices 110. Server system 108 may receive the viewing metrics from the client applications 114 on the electronic device 110 via the network 102.

At block 406, the server system 108 identifies visual tags for visual media viewed by the electronic devices 110 by users. The visual tags identify objects in each of the visual media being served to the client devices 110. For example, a first video or still image may be tagged as including a person, a boy, and a clothing object and a second video or still image may be tagged as including a person, a girl, an animal, and a dog object. In one example, the tagged elements for each piece of visual media is determined using an object detection machine learning model and the determined objects are stored along with an identifier for the visual media including those objects in a database (e.g., database 126).

At block 408, the server system 108 selects a subset of the identified visual tags (block 408) by applying a taxonomy-based filter. The taxonomy-based filter may include a hierarchical tree structure. In one example, level one (1) of the hierarchical tree structure is a broad category, e.g., real objects, level two (2) is a first subset, e.g., person, clothing, etc., level three (3) is a second subset, e.g., boy under person, and shorts under clothing. The server system selects the subset of the identified visual tags from the identified visual tags located at one or more specific levels in a taxonomy of the taxonomy-based filter. In one example, the server system 108 only selects visual tags from one or more specific abstraction levels (e.g., level 2 and level 3 as other levels may be too general or too specific in detecting meaningful viewing patterns). In accordance with this example, one or more other levels may be selected depending on the taxonomy. In another example, the server system 108 only selects tags from levels having a specific characteristic (e.g., leaf nodes; i.e., a node with no subset nodes). Other selection techniques, including combinations of one or more of the provided examples, may be utilized to select visual tags and are considered within the scope of the present invention.

At block 410, the server system 110 generates pattern candidates. In one example, each of the pattern candidates including two or more of the identified visual tags from the subset of the identified visual tags. In one example, the server system generates the pattern candidates by generating all combinations of the identified visual tags in the subset of the identified visual tags having a number, N, of visual tags, where N is equal or greater than 2 (block 602). In one implementation of this example, all generated combinations are used as pattern candidates. In another implementation, one or more combinations are removed from the generated combinations to derive the pattern candidates. For example, the system may identify prohibited combinations within the generated combinations (e.g., those having a parent-child relationship such a shoes and sandals) within the taxonomy of the taxonomy-based filter (block 604) and omit those prohibited combinations from the pattern candidates (block 606).

At block 412, the server system 110 evaluates viewing metrics for each of the generated pattern candidates. The server system may evaluate consumption metrics of the visual media by the first group of users (e.g., a group of users with similar characteristics such as age group, gender, etc.) for each of the generated pattern candidates. In one example, the server system 110 evaluates the consumption metrics by receiving one or more consumption metrics from each of the first group of users (block 702), scoring each of the generated pattern candidates responsive to the received consumption metrics (block 706; e.g., by calculating a ratio of an average percentage of viewing time out of an associated length of time that a group viewed each visual media), and aggregate the scoring (block 706; e.g., aggregate the calculated ratio for each pattern candidate).

For a video (which has an associated length of time), the consumption metrics may include total viewing time and the scoring may include calculating a ratio of an average percentage of time out of the associated length of time that the first group viewed each of the videos and aggregating, for each pattern candidate, the ratio of the average percentage of time out of the associated length of time that the first group viewed each of the videos. For a still image, the consumption metrics may include a number of time viewed or shared and the scoring may include calculating a ratio of the total number of times viewed or shared to the total number of unique images viewed by the first group and aggregating, for each pattern candidate, the ratio of the average number of times viewed or shared out of the total number of unique images the first group viewed.

In one example, a z-score is generated that describes the difference between the consumption metric in the target pattern and the other patterns. In accordance with this example, the consumption metric may be based on a combination of two content consumption metrics for a video (e.g., a sum of view time ratio (or VTR) for all videos with a specific pattern and the total number of records with a specific pattern. The view time ratio can be calculated as shown in equation (1):

$$VTR(s) = \frac{1}{\text{size}(V)} \Sigma_{v \text{ in } V} \frac{\text{view time}(s, v)}{\text{video duration}(s, v)}, \quad (1)$$

where V is the set of viewers of the video, s, and size(V) is the number of viewers of video, s.

At block 414, the server system 110 ranks the generated pattern candidates. In one example, the generated pattern candidates are ranked in accordance with their z-score. In accordance with this example, a higher z-score refers to a pattern that is more different from the average (normal behavior) and, thus, indicates an emerging pattern and a lower z-score indicates a non-emerging pattern.

At block 416, the server system 110 visually presents rankings. In one example, the pattern detection system 124 generates a graph for visual presentation on a display. In accordance with this example, the pattern detection system 124 may select the ten pattern candidates having the highest z-score and present those candidates in order based on their z-score along with the objects making up those candidates.

In one example, the rankings (e.g., based on z-score) are validated using a multi-fold (e.g., 5-fold) cross validation. In accordance with this example, assuming a K-fold cross validation, the pattern detection system 124 separates the dataset into K folds, each including a different grouping of training and validation sets. For each fold, the pattern detection system 124 uses the training set to find the best pattern, e.g., based on the highest z-score. The pattern detections system 124 then labels the visual media in the validation set with a high score as + and without a high score as −. After labeling the entire dataset with + and −, the pattern detection system compares the user engagement (viewing time, etc.) of group + and − to get the z-score. This process is repeated for each fold to get a median z-score (i.e., an unbiased z-score, which becomes the z-score).

At block 502, an electronic device (e.g., the client device 110) downloads and installs the viewing metric application 114. In one example, the client device 110 receives the viewing metric application 114 from the server system 108 over the network 102 via the API server 120 of the application server 104.

Figure 8:
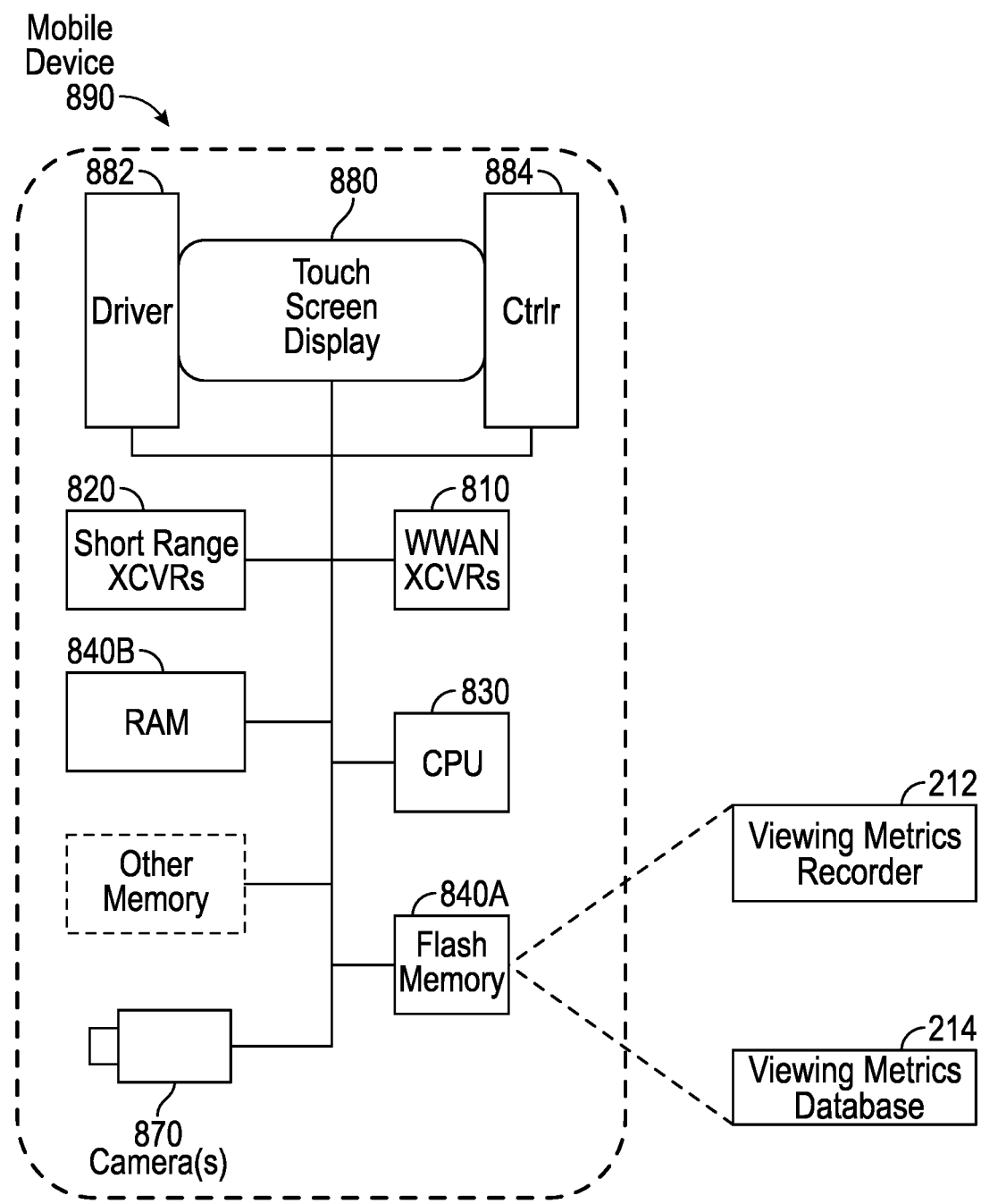
FIG. 8 is a diagrammatic representation of an example hardware configuration for a client device embodied as a mobile device.

At block 504, the client device 110 executes the viewing metric application 114. A processor (e.g., CPU 830; FIG. 8) of the client device 110 executes the viewing metric application 114. In one example, the processor generates a viewing metrics database 214 in memory of the client device 110 for recording viewing metrics associated with visual media presented by the client device 110.

At block 506, the client device 110 records the viewing metrics. In one example, the processor of the client device 110 gathers viewing metrics (e.g., from the video controller 310) and records the viewing in memory.

At block 508, the client device 110 stores the viewing metrics. In an example, the client device stores the recorded viewing metrics in a viewing metrics database 214 in the memory of the client device 110.

At block 510, the client device 110 uploads the viewing metrics to the server system 108. In one example, the client device 110 retrieves the viewing metrics from the viewing metrics database 214 and sends the viewing metrics to the server system 108 over the network 102 via the API server 120 of the application server 104.

FIG. 8 is a high-level functional block diagram of an example client device 110 embodied as an example mobile device 890 that includes the viewing metrics recorder 212 and the viewing metrics database 214. Mobile device 890 includes a flash memory 840A which includes programming to perform all or a subset of the functions described herein for viewing metrics recorder 212 and viewing metrics database 214. Mobile device 890 can include a camera 870 that comprises at least one visible light camera (e.g., first and second visible light cameras with overlapping fields of view or a visible light camera and a depth sensor with substantially overlapping fields of view). Memory 840A may further include multiple images or video, which are generated via the camera 870.

As shown, the mobile device 890 includes an image display 880, an image display driver 882 to control the image display 880, and a controller 884. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for the viewing metrics recorder 212 and the viewing metrics database 214. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications, including programming for the viewing metrics recorder 212 and the viewing metrics database 214 are executed. Applications, such as viewing metrics recorder 212 and the viewing metrics database 214, may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
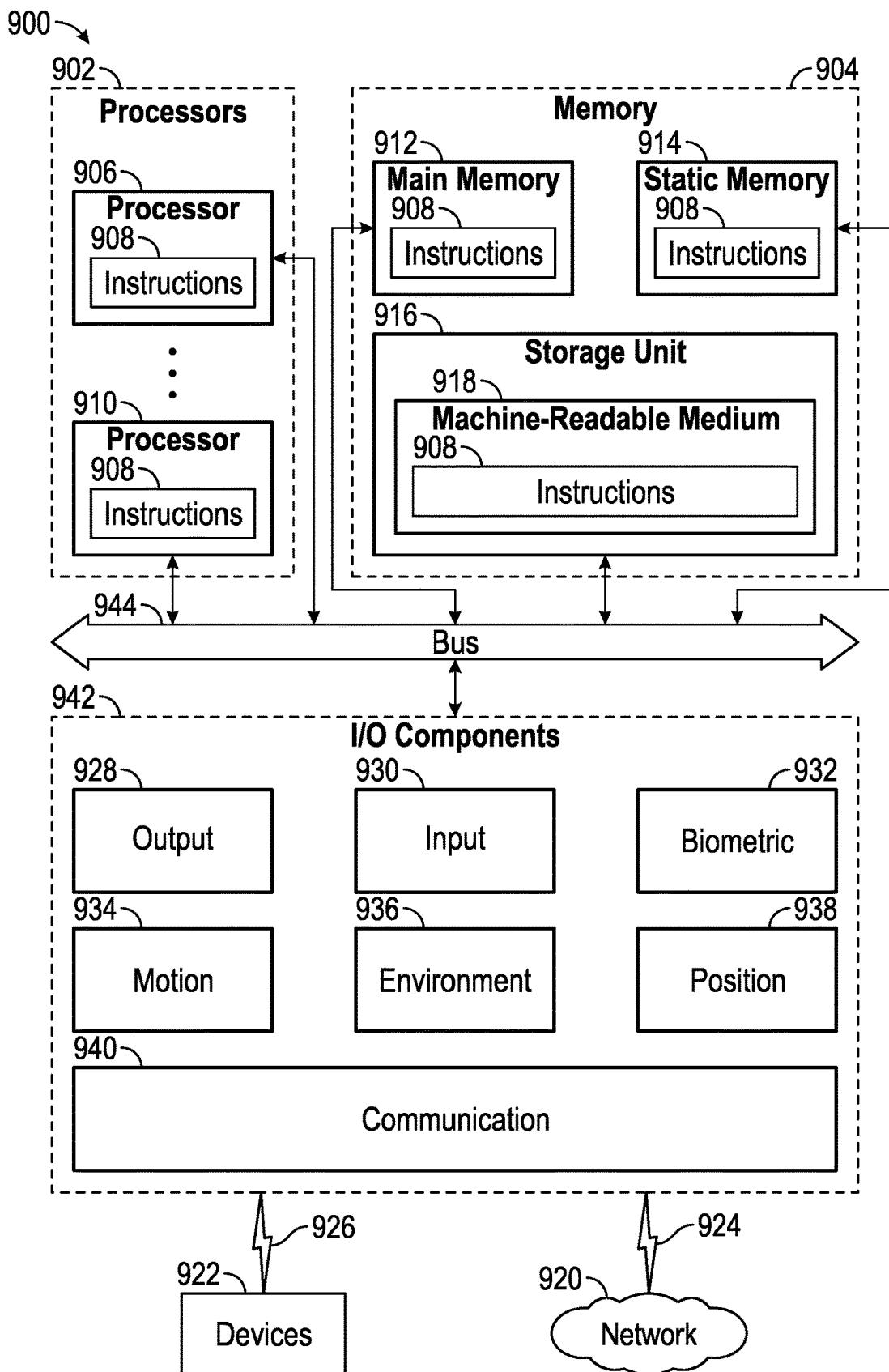
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiple cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
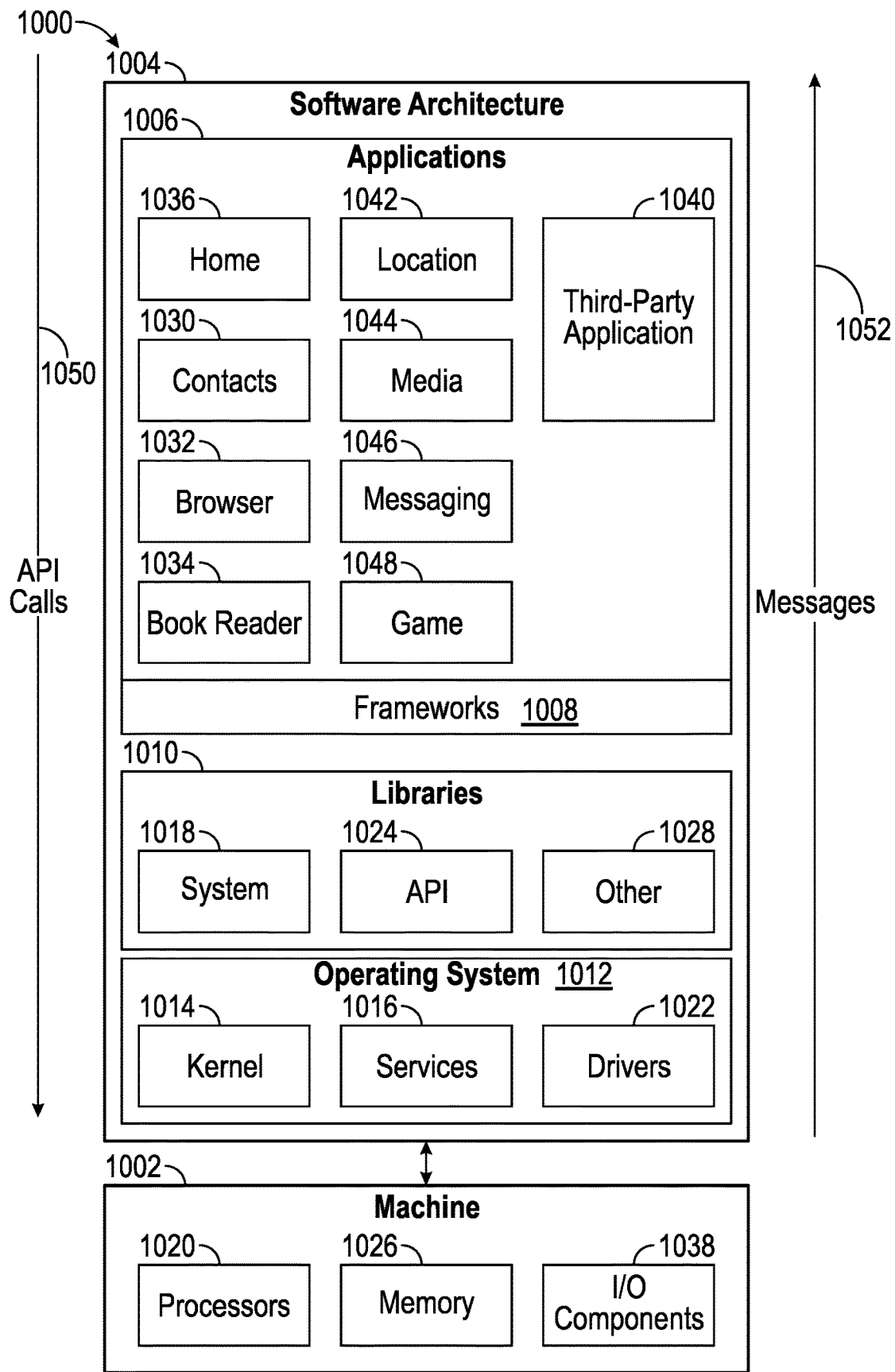
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method for scheduling visual media based on emerging viewing patterns for viewed visual media, the method comprising:
    identifying visual tags for each of a plurality of viewed visual media viewed by users;
    generating pattern candidates from the identified visual tags, each of the pattern candidates including two or more of the identified visual tags;
    evaluating consumption metrics of the viewed visual media by the users for each of the generated pattern candidates;
    identifying emerging viewing patterns for the users responsive to the evaluated consumption metrics; and
    scheduling the visual media to serve to the users based on the identified emerging viewing patterns.

2. The method of claim 1, wherein the identifying visual tags comprises:
    applying a machine learning model to the plurality of viewed visual media.

3. The method of claim 1, wherein the method further comprises:
    selecting a subset of the identified visual tags;
    wherein the generating the pattern candidates comprises generating all combinations of the identified visual tags in the subset of the identified visual tags having a number, n, of visual tags;
    wherein n is equal or greater than 2.

4. The method of claim 1, wherein the evaluating the consumption metrics comprises:
    receiving one or more consumption metrics from each of the users; and
    scoring each of the generated pattern candidates responsive to the received consumption metrics.

5. The method of claim 4, wherein the viewed visual media are videos, each of the videos has an associated length of time, and the one or more consumption metrics includes total viewing time, and wherein the scoring comprises:
    calculating a ratio of an average percentage of time out of the associated length of time that the users viewed each of the videos; and
    aggregating, for each pattern candidate, the ratio of the average percentage of time out of the associated length of time that the users viewed each of the videos.

6. The method of claim 1, wherein the identifying the emerging viewing patterns comprises ranking the generated pattern candidates responsive to the evaluated consumption metrics and wherein the method further comprises:
    generating a graph of the ranking of the generated pattern candidates; and
    presenting the graph on a display.

7. The method of claim 1, wherein the users are one of a plurality of groups of users and wherein the identifying the emerging viewing patterns comprises ranking the generated pattern candidates responsive to the evaluated consumption metrics, the method further comprising:
    repeating each of the steps of claim 1 for at least one other group of users;
    generating a graph of the rankings of the generated pattern candidates for each of the groups of users; and
    presenting the graph on a display.

8. The method of claim 1, where the evaluating the consumption metrics comprises:

applying a multi-fold cross validation consumption metrics of the viewed visual media by the users for each of the generated pattern candidates.

9. A system for scheduling visual media based on emerging viewing patterns for viewed visual media, the system comprising:

a memory that stores instructions:
a processor configured to execute the instructions to perform operations to:
identify visual tags for each of a plurality of visual media viewed by users;
generate pattern candidates from the identified visual tags, each of the pattern candidates including two or more of the identified visual tags;
evaluate consumption metrics of the viewed visual media by the users for each of the generated pattern candidates;
identify emerging viewing patterns for the users responsive to the evaluated consumption metrics; and
schedule the visual media to serve to the users based on the identified emerging viewing patterns.

10. The system of claim 9, wherein the processor applies a machine learning model to the plurality of visual media to identify visual tags.

11. The system of claim 9, wherein the processor is configured to execute the instructions to perform further operations to:

select a subset of the identified visual tags;
wherein to generate the pattern candidates the processor generates all combinations of the identified visual tags in the subset of the identified visual tags having a number, n, of visual tags;
wherein n is equal or greater than 2.

12. The system of claim 9, wherein the processor evaluates the consumption metrics by:

receiving one or more consumption metrics from each of the users; and
scoring each of the generated pattern candidates responsive to the received consumption metrics.

13. The system of claim 12, wherein the viewed visual media are videos, each of the videos has an associated length of time, and the one or more consumption metrics includes total viewing time, and wherein the scoring comprises:

calculating a ratio of an average percentage of time out of the associated length of time that the users viewed each of the videos; and
aggregating, for each pattern candidate, the ratio of the average percentage of time out of the associated length of time that the users viewed each of the videos.

14. The system of claim 9, further comprising:

a display;
wherein to identify the emerging viewing patterns the processor ranks the generated pattern candidates responsive to the evaluated consumption metrics;
wherein the processor is further configured by the instructions to perform additional operations to:
generate a graph of the ranking of the generated pattern candidates; and
visually present the graph on the display.

15. The system of claim 9, further comprising a display, wherein the users are one of a plurality of groups of users, wherein to identify the emerging viewing patterns the processor ranks the generated pattern candidates responsive to the evaluated consumption metrics, wherein the users are one of a plurality of groups of users, and wherein the processor is further configured by the instructions to perform additional operations to:

repeat each of the operations of claim 9 for at least one other group of users;
generate a graph of the rankings of the generated pattern candidates for each of the groups of users and the at least on other group of users; and
present the graph on the display.

16. The system of claim 9, wherein to evaluate the consumption metrics the processor:

applies a multi-fold cross validation consumption metrics of the viewed visual media by the users for each of the generated pattern candidates.

17. A non-transitory processor-readable storage medium storing processor-executable instructions for scheduling visual media based on emerging viewing patterns for viewed visual media that, when executed by a processor of a machine, cause the machine to perform operations comprising:

identifying visual tags for each of a plurality of viewed visual media viewed by users;
generating pattern candidates from the identified visual tags, each of the pattern candidates including two or more of the identified visual tags;
evaluating consumption metrics of the viewed visual media by the users for each of the generated pattern candidates;
identifying emerging viewing patterns for the users responsive to the evaluated consumption metrics; and
scheduling the visual media to serve to the users based on the identified emerging viewing patterns.

18. The non-transitory processor-readable storage medium of claim 17, wherein the instructions, when executed by a processor of a machine, cause the machine to perform a further operation comprising selecting a subset of the identified visual tags;
wherein the generating the pattern candidates comprises generating all combinations of the identified visual tags in the subset of the identified visual tags having a number, n, of visual tags;
wherein n is equal or greater than 2.

19. The non-transitory processor-readable storage medium of claim 17, wherein the evaluating the consumption metrics comprises:

receiving one or more consumption metrics from each of the users; and
scoring each of the generated pattern candidates responsive to the received consumption metrics.

20. The non-transitory processor-readable storage medium of claim 19, wherein the visual media are videos, each of the videos has an associated length of time, and the one or more consumption metrics includes total viewing time, and wherein the scoring comprises:

calculating a ratio of an average percentage of time out of the associated length of time that the users viewed each of the videos; and
aggregating, for each pattern candidate, the ratio of the average percentage of time out of the associated length of time that the users viewed each of the videos.

* * * * *